United States Patent
Millar et al.

(10) Patent No.: US 10,948,583 B2
(45) Date of Patent: Mar. 16, 2021

(54) RADAR TRACK INITIALIZATION

(71) Applicant: Valeo Radar Systems, Inc., Hudson, NH (US)

(72) Inventors: Jeffrey Millar, Mont Vernon, NH (US); Akram Ahmadi Kalate, Bedford, MA (US); Jan Kubak, Nashua, NH (US)

(73) Assignee: Valeo Radar Systems, Inc., Troy, MI (US)

( * ) Notice: Subject to any disclaimer, the term of this patent is extended or adjusted under 35 U.S.C. 154(b) by 380 days.

(21) Appl. No.: 16/168,130

(22) Filed: Oct. 23, 2018

(65) Prior Publication Data

US 2020/0124716 A1    Apr. 23, 2020

(51) Int. Cl.
*G01S 7/40* (2006.01)
*G01S 13/931* (2020.01)
*G01S 13/72* (2006.01)

(52) U.S. Cl.
CPC .............. *G01S 13/726* (2013.01); *G01S 7/40* (2013.01); *G01S 13/931* (2013.01)

(58) Field of Classification Search
CPC ......... G01S 13/726; G01S 7/40; G01S 13/931
See application file for complete search history.

(56) References Cited

U.S. PATENT DOCUMENTS

| | | | |
|---|---|---|---|
| 6,608,589 B1 * | 8/2003 | Devereux | G01C 21/00 342/357.29 |
| 6,675,094 B2 * | 1/2004 | Russell | G05D 1/0257 701/301 |
| 6,859,170 B2 * | 2/2005 | Devereux | G01C 21/00 342/357.29 |
| 7,071,068 B2 | 7/2006 | Jeong | |
| 2016/0103213 A1 * | 4/2016 | Ikram | G01S 13/42 342/105 |
| 2018/0045814 A1 * | 2/2018 | Slapak | G01S 13/726 |

* cited by examiner

*Primary Examiner* — Erin F Heard
*Assistant Examiner* — Donald H B Braswell
(74) *Attorney, Agent, or Firm* — Daly, Crowley, Mofford & Durkee LLP

(57) ABSTRACT

A method and apparatus for initializing a radar track are presented. The method includes: detecting a target within a field of view where the target having a detected range, radial velocity and azimuth; initializing values of a Kalman filter upon initial detection of the target based upon the detected range, radial velocity and azimuth; generating a azimuth value and estimated azimuth rate value of the target; determining a first estimated error value associated with the azimuth value and a second estimated error value associated with the estimated azimuth rate value based upon the detected azimuth; estimating a cross track error based upon the first and second estimated errors; in response to the estimated cross track error value being lower than a predetermined threshold value, reinitializing the values of the Kalman filter; and establishing a radar track based upon the reinitialzied values of the Kalman filter.

14 Claims, 9 Drawing Sheets

RADAR TRACK INITIALIZATION

TECHNICAL FIELD

The concepts, systems, circuits, devices and techniques described herein relate generally to radar systems and more particularly to automotive radar systems.

BACKGROUND

As is known in the art, automotive radar systems detect a target that produces a radar return signal. From the return signal, the radar systems compute or otherwise determine measurement data about the target. Based upon such measurement data, the radar estimates position and velocity for each target to identify its location. The position and velocity measurements are used to establish a so-called "radar track" (or more simply a "track") for the target. When multiple targets are detected, the radar system will establish a track for each target.

Some radar systems establish tracks using a Kalman filter. Kalman filtering is a technique which utilizes a series of measurement data of a variable over time to produce an estimate of the variable. Kalman filtering is also known as linear quadratic estimation (LQE).

Conventional radar systems initialize the Kalman filter on the first detection of a target. The detection may produce range, radial velocity (Vr) and azimuth measurements of a target, which are data in polar coordinates of the target. The Kalman filter may operate in a number of ways. One approach is operating the Kalman filter to convert from polar coordinates to Cartesian coordinates: position (Px, Py) and velocity (Vx, Vy). The measurement in the direction of the target provides a radial velocity but does not provide a tangential velocity. From the one dimensional measurement of velocity measurement, it is not possible to generate measurements in two dimensions of positions. Since some of the position and velocity values (Px, Py, Vx, and Vy) are not provided from the initial detection, some default rules may be utilized to initialize values of the Kalman filter. For example, on the first detection of the target, velocity values Vx, Vy are not known. A tangential velocity (Vt) is not known either. Accordingly, the Kalman filter is initialized with velocity values Vx, Vy corresponding to a velocity vector, and Vt set to zero assuming that the target is headed directly towards the radar. Although, for targets heading directly towards the host, this is an acceptable initialization algorithm, for targets that are not heading directly towards the host, the initialized values of the Kalman filter are incorrect. The assumption of the target heading towards the radar is a good assumption for a tracking method that needs to alert on possible collisions as quickly as possible, but the assumption is not effective if an alert on a target that is not on a collision course is not needed. Thus, the Kalman filter requires additional data (and thus time) to correct the values. There are other solutions that check whether the initialization of the Kalman filter values are in error and replay the data to generate an improved initial estimate. The replay data function keeps a history of the detection data from the first detection up to the point of initializing the Kalman filter. If the difference between the estimated heading at the end of the detection and the initial assumption is bigger than a threshold, a solution is to replay the history of detections with a different starting assumption that is determined based upon the estimated heading at the end of the previous detection. This replay may produce a better estimate of heading. These solutions, however, have limitations, such as unacceptable computational overhead, requiring multiple iterations, and the complexity of the solution.

Furthermore, some existing solutions validate (or establish) tracks on fixed criteria such as ten (10) detections out of twelve (12) measurements. One problem with this approach, however, is that it does not adapt to target speed or range. This problem causes difficulties for both low speed and high-speed targets. For example, a low-speed target may accumulate 10 of 12 detections very quickly without much target motion, but the heading is still uncertain due to the small distance traveled. On the other hand, a high-speed target may travel a large distance and may get too close to the radar while accumulating 10 of 12 detections. Another limitation is that the approach does not take into account missing detections for a tracked object which is caused by either random noise or multipath fading. When multiple signals travel different paths but arrive a destination at the substantially same time, the signals may cancel each other. This effect is referred to as multipath fading, and it may cause "gaps" in object tracked trajectory. In order to offset the multipath fading effect, the Kalman filter is required to "coast" the track, meaning that the Kalman filter projects the track position based upon the accumulated best estimate of position and velocity. Due to this operational difficulty, instead of modeling the gaps as occasional random drops, fading modeling with sustained drops may be appropriate to generate a better estimate of a target. Accordingly, a solution that can handle consecutive faded detections is required.

Accordingly, a new system that addresses these shortcomings of the previous systems and techniques is needed.

SUMMARY

In accordance with the concepts, techniques and systems described herein is an efficient method for initializing a radar track. The techniques and systems described herein may handle measurement data from a fading target or a target with rapid changes in the speed, and may enable establishing a radar track more rapidly with accurate estimation.

Such techniques may be used in a variety of applications including but not limited to applications in which a radar or a sensor is used to in a moving object.

According to one illustrative embodiment, a method for initializing a radar track may include: detecting a target within a field of view, the target having a detected range, radial velocity and azimuth; initializing values of a Kalman filter upon initial detection of the target based upon the detected range, radial velocity and azimuth; generating a azimuth value and estimated azimuth rate value of the target; determining a first estimated error value associated with the azimuth value and a second estimated error value associated with the estimated azimuth rate value based upon the detected azimuth; estimating a cross track error based upon the first and second estimated errors; in response to the estimated cross track error value being lower than a predetermined threshold value, reinitializing the values of the Kalman filter; and establishing a radar track based upon the re-initialzied values of the Kalman filter.

In embodiments, the step of generating the azimuth value and estimated azimuth rate value may include: applying weighted incremental linear regression to the detected azimuth value to generate the azimuth value and the estimated azimuth rate values and to determine the first and the second estimated error values.

In embodiments, the method may include: determining a tangential velocity of the target based upon the estimated azimuth rate value and the detected range; and determining polar coordinates, a lateral velocity, and a longitudinal velocity of the target based upon the detected range, radial velocity, and the determined tangential velocity of the target.

In embodiments, the method may include reinitializing the values of the Kalman filter based upon the determined polar coordinates, lateral velocity, and longitudinal velocity of the target.

In embodiments, an estimate of signal-to-noise ratio (SNR) may be used when determining the first and second estimated errors.

In embodiments, the method may include applying a smoothing filter to the output of the Kalman filter to filter out rapid changes with heading of the target with a predetermined filtering ratio.

In embodiments, the method may include: waiting for a duration of time determined from a list of wait times according to the detected range of the target; and in response to the duration being elapsed, abandoning to establish a radar track of the target.

According to another illustrative embodiment utilizing the concepts described herein, a sensor may include: a transceiver configured to transmit and receive signals to collect measurement data; and a signal processor configured to receive the measurement data from the transceiver. Herein, the signal processor may be configured to: detect a target within a field of view, the target having a detected range, radial velocity and azimuth position based upon the measurement data; initialize values of a Kalman filter upon initial detection of the target based upon the detected range, radial velocity and azimuth; generate an azimuth value and estimated azimuth rate value of the target; determine a first estimated error value associated with the azimuth value and a second estimated error value associated with the estimated azimuth rate value based upon the detected azimuth value; estimate a cross track error based upon the first and second estimated errors; in response to the estimated cross track error value being lower than a predetermined threshold value, reinitialize the values of the Kalman filter; and establish a radar track based upon the reinitialized values of the Kalman filter.

In embodiments, the signal processor may be configured to: apply weighted incremental linear regression to the detected azimuth value to generate the azimuth and the estimated azimuth rate values and to determine the first and the second estimated error values.

In embodiments, the signal processor may be coupled to a user interface, the user interface being configured to: display the detected range, the detected radial velocity, the azimuth value, the estimated azimuth rate value, the first estimated error, and the second estimated error.

In embodiments, the user interface may be further configured to display a probability of collision with the target.

In embodiments, the user interface may be further configured to: display the measurement data collected by the transceiver.

In embodiments, the signal processor may be further configured to alert a decision to an external system in response to the values of Kalman filter being reinitialized.

In embodiments, the sensor may further include: a second transceiver, wherein the transceiver transfers additional measurement data from the second transceiver and the signal processor uses the additional measurement data to establish the radar track.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

All relative descriptions herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

Figure 1:
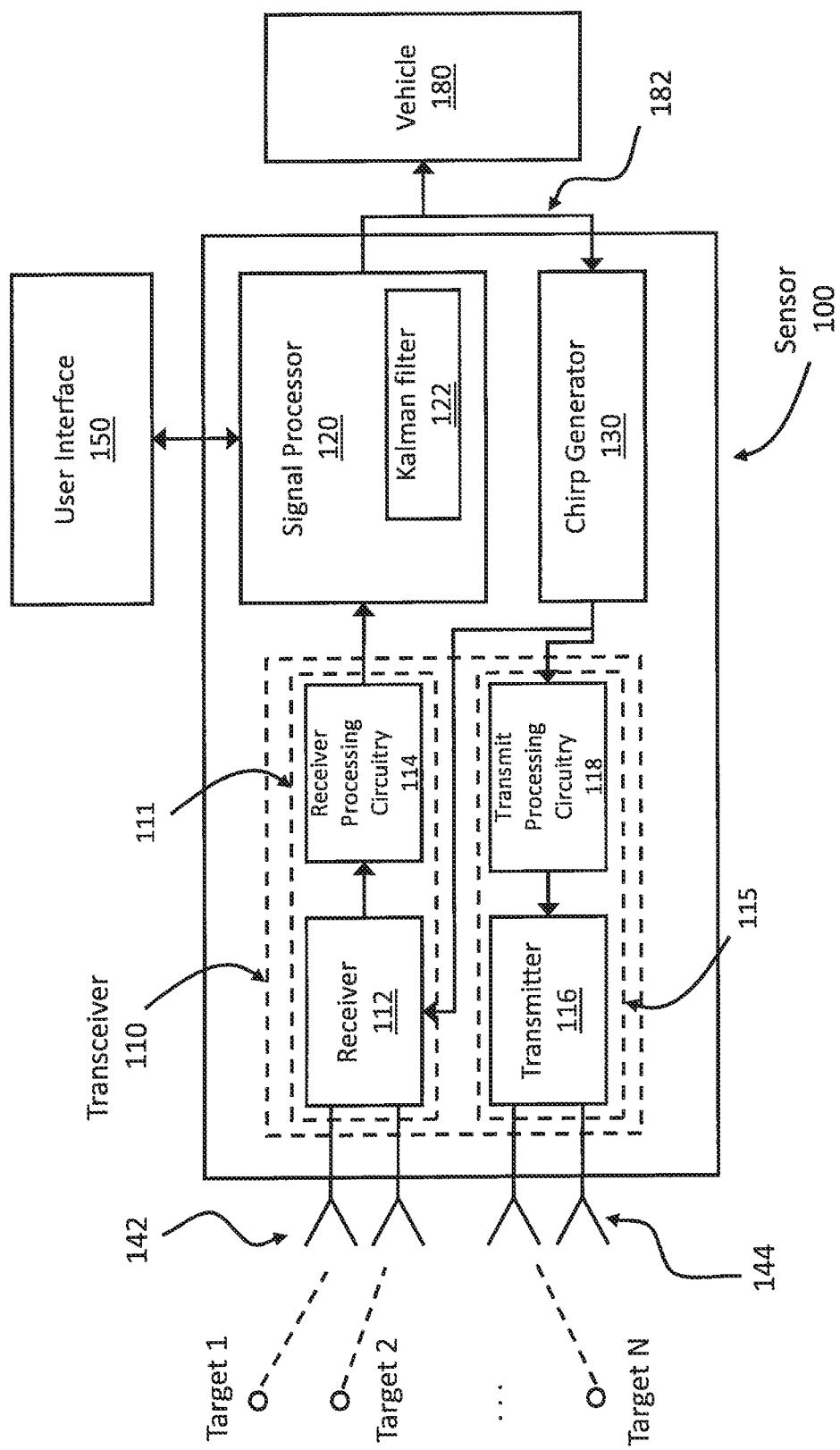
FIG. 1 is a block diagram of an illustrative vehicle radar system according to the concepts described herein.

Referring now to FIG. 1, an illustrative vehicle radar system 100 includes a transceiver 110 having a receive signal path 111 and a transmit signal path 115. Receive signal path 111 may include a receiver 112 (e.g., a radio frequency (RF) receiver) and receiver processing circuitry 114 which operates on an intermediate frequency signal provided thereto by the RF receiver. Transmit signal path may include transmitter 116 and transmit processing circuitry 118.

One or more receive antennas 142 (each of which may comprise a single antenna element or an array of antenna elements) is coupled to an input of receiver 112 and one or more transit antennas 144 (each of which may comprise a single antenna or an array of antenna elements) are coupled to the transmitter 116. The receive antennas 142, receiver 112, and receive circuitry 114 thus form a receive path. Similarly, transmit antennas 144, transmitter 116, and transmit processing circuitry 118 form a transmit path.

In some embodiments, the transceiver 110 may include more than one receiver and transmitter respectively. A chirp generator 130 is coupled to each of the receiver 112 and transmitter 116 and provides chirp signals thereto. As used herein, the term "chirp" is used to describe a signal having a characteristic (e.g., frequency, amplitude, or any other characteristic or combinations of any characteristics) that varies with time during a time window. The chirp generator enables the sensor 100 to transmit a transmit signal having a chirp waveform and also enables the sensor to receive and process return signals resultant from the transmitted chirp waveform. The chirp generator 130 may also be configured to provide control or other signals to the vehicle 180 and/or receive control or other signals from the vehicle 180 via a signal path 182. In some embodiments, the receiver 112 provides signals characterizing an object within a field of view of the sensor 100 to vehicle 180 via the signal path 182. The signals may include, but are not limited to, a target detection signal when a target is detected or a radar track signal when a track is established for a target. The signals may be coupled to a control unit of vehicle 180 for various uses such as blind spot and rear object detection.

The receiver 112 may include a plurality of receive antennas 142 and can be configured to receive RF signals (e.g., FMCW chirp signals). In an embodiment, outputs of receive antennas are coupled to separate receive paths within the receiver 112 and subsequently coupled to inputs of the receiver processing circuitry 114, which may for example process receive signals in digital form. The receiver 112 receives return RF chirp signals from the receive antennas and down-converts the signals to intermediate frequency (IF) signals which are then provided to the receiver processing circuitry 114 and subsequently to other processing portions of vehicle 120. One example of an FMCW chirp system is described in U.S. Pat. No. 7,071,068 assigned to the assignee of the present application and hereby incorporated herein by reference.

The sensor 100 may be coupled to (e.g., communicatively or directly) or be a component of an automotive vehicle 180 for various applications, such as but not limited to, detecting one or more objects, or targets in the field of view of vehicle 180. As will be apparent to those of ordinary skill in the art, the sensor 100 is also suitable for use in many different types of applications including but not limited to any land-based vehicle and/or marine applications in which the sensor 100 can be disposed on a boat, ship or other sea vessel and may also find use in aerial vehicles (including, but not limited to, unmanned aerial vehicles). The sensor 100 is configured to operate at frequencies suitable for applicable operation (e.g., marine, land or airborne operation).

The transceiver 110 may detect one or more targets using radar signals which are generated via chirp generator and provided to an input of the transmit signal path and emitted via transmit antenna 144. Portions of the emitted transmit signal which intercepts objections may be reflected or otherwise re-directed back toward sensor 100 from an object (also sometimes referred to herein as a "target object" or more simply a "target") and are received by receive antenna 142. Receive antenna 142 provides the signals received thereby to an input of receive signal path 111. In this way, receive signal path of transceiver 110 collects measurement data of the object from the radar signals and transfers such measurement data to signal processor 120. The signal processor 120 is coupled to transceiver 110, and particularly, signal processor 120 may be coupled directly to receiver processing circuitry 114 and receive measurement data therefrom. The signal processor 120 processes the measurement data and provides processed information to the vehicle 180. In particular, the signal processor 120 may process the measurement data via a tracker which includes at least a Kalman filter 122 that provides the best estimate of a target position to establish a radar track for the target as will be described below at least in conjunction with FIG. 4.

The signal processor 120 may be coupled to a user interface 150. The illustrative block diagram of FIG. 1 shows that the user interface is located separately from the sensor 100. However, as can be appreciated by those of ordinary skill in the pertinent art, the user interface may be provided as part of the sensor 100. In some embodiments, the user interface 150 may be part of the vehicle 180. The signal processor 120 may provide information to the user interface 150, and the user interface 150 may display (or otherwise provide, e.g. via audio signals, mechanical signals or other signals) a detected range, radial velocity, azimuth and track of a target to a user. The user interface 150 may also display or otherwise provide to an operator of the vehicle value including but not limited to a projected azimuth, an estimated azimuth rate value, a first estimated error, and a second estimated error of the target. In some embodiments, the user interface may display a probability of collision (e.g., as may be determined from some or all of those mentioned above) with a target. If the probability is higher than a predetermined threshold, the user interface 150 may display or otherwise provide a warning signal (e.g., a visual, audio or mechanical signal) to an operator of the vehicle. The user interface also may display the measurement data collected by the transceiver to a user.

Figure 2:
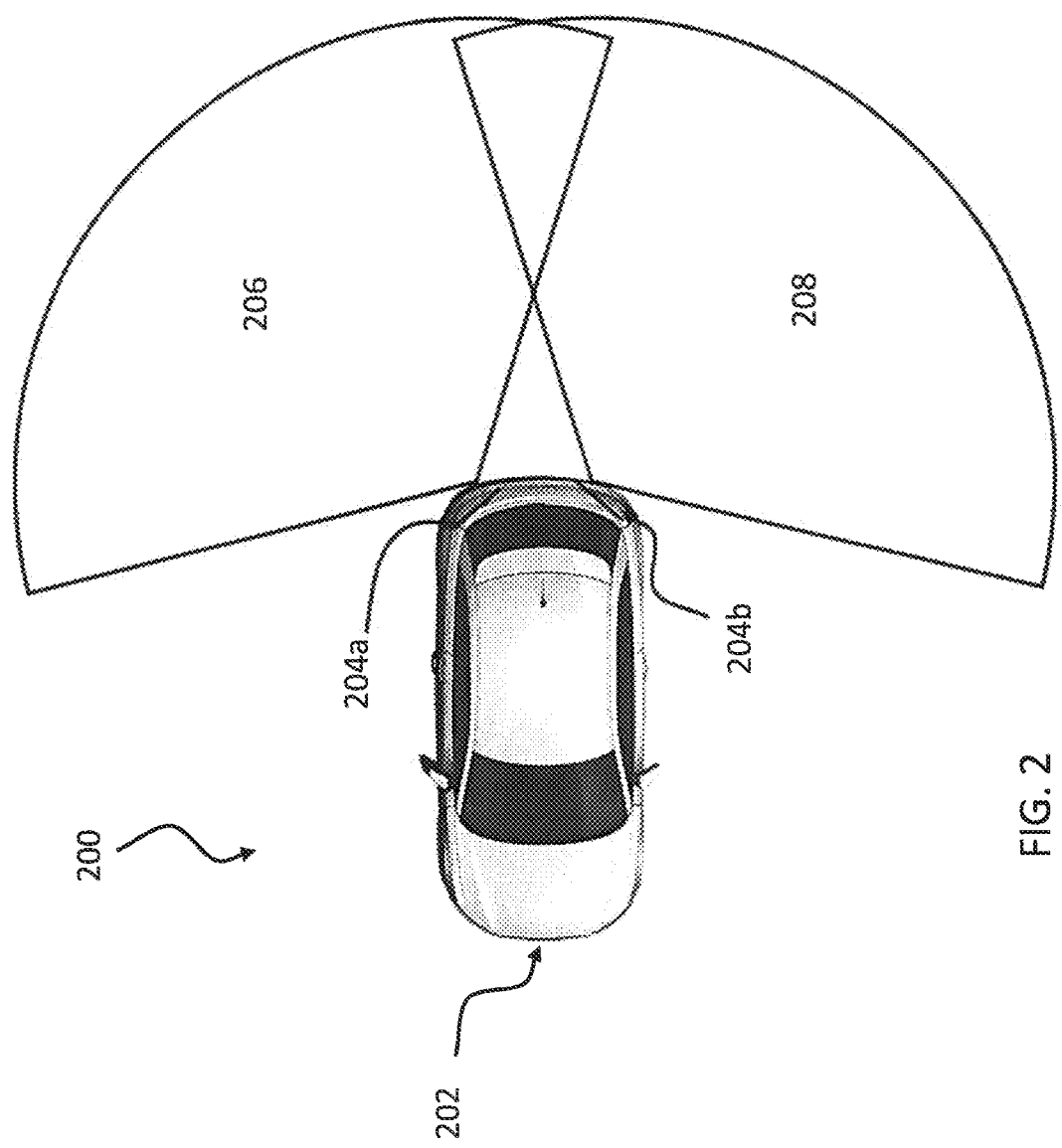
FIG. 2 is a diagram that shows field of views for a vehicle radar system according to the concepts described herein.

Referring now to FIG. 2, a vehicle 202 is equipped with one or more radar sensors 204a, 204b (generally denoted 204). In an illustrative embodiment, the vehicle may have first and second sensors 204a, 204b arranged in a rear portion of vehicle 202. While a system using two sensors are shown and described, it should be appreciated that the system could be used with only a single sensor or any number of sensors greater than two. Further, while object detection at a rear of a vehicle is described, it should be appreciated that the same concepts may equally apply to detection of an object by sensors deployed at the front of a vehicle. Such a sensing system disposed for operation at the front of a vehicle (e.g., in a vehicle moving in a forward direction), may be useful in autonomous driving applications and for object detection at low speed in general.

Sensor 204a has a first field of view 206 while sensor 204b has a second field of view 208. Within each of the field of views, the sensors 204a, 204b may detect one or more target objects Target-1, Target-2, . . . Target-N (e.g., up to N targets). When one of sensors 204a, 204b detects a target, the sensor collects measurement data about the target and process the measurement data to initialize a radar track, as will be described below at least in conjunction with FIG. 4.

Figure 3:
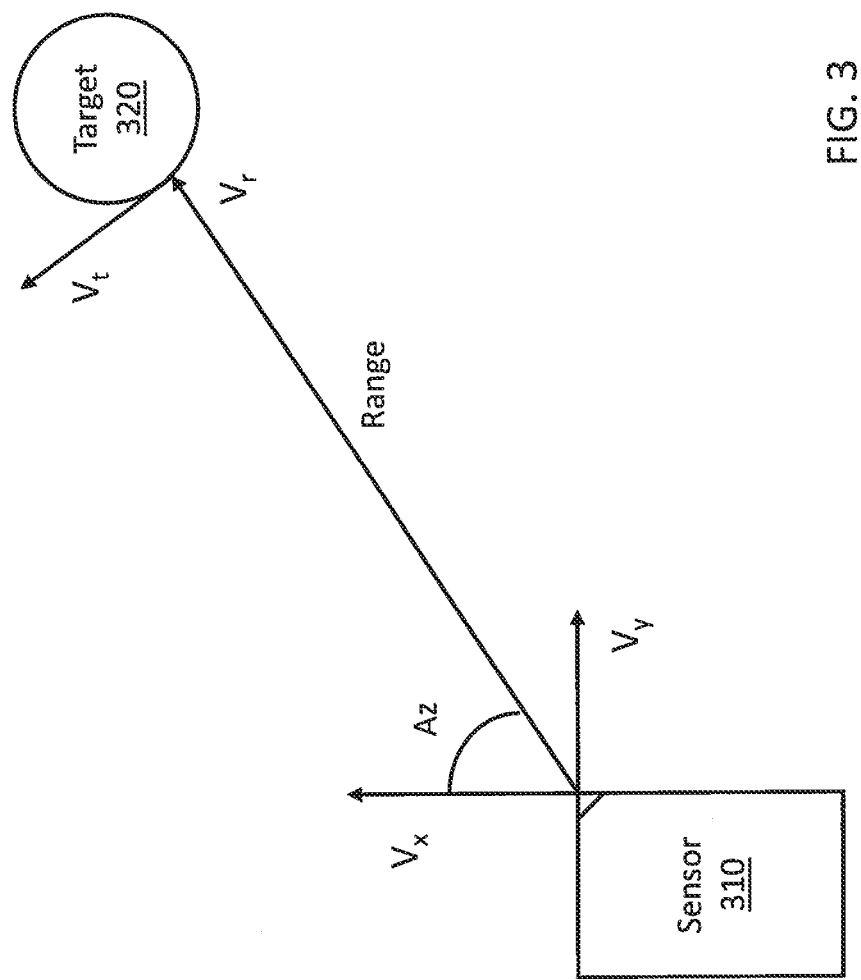
FIG. 3 is a diagram showing measurement data (or information) of a target for establishing a track according to the concepts described herein.

Referring now to FIG. 3, a sensor 310 (which may be the same as or similar to sensors 100, 204a or 204b described above in conjunction with FIGS. 1 and 2) detects a target object 320 via radar signals sent and received by the sensor and processes the received (or return) signals to determine measurement data of the target object. The measurement data of target 320 may include a range, lateral and longitudinal velocities ($V_x$, $V_y$), Cartesian coordinate positions ($P_x$, $P_y$), an azimuth angle (Az), a radial velocity ($V_r$), and a tangential velocity ($V_t$). The lateral and longitudinal velocities ($V_x$, $V_y$) and Cartesian coordinate positions ($P_x$, $P_y$) represent a direction and position of target 320 in a Cartesian coordinate system.

A Kalman filter (e.g., Kalman filter 122 in FIG. 1) is updated with lateral and longitudinal velocities ($V_x$, $V_y$). However, in some embodiments, $V_x$ and $V_y$ are not directly measurable. Rather, range (R) and azimuth (Az) values of the target object relative to the sensor are measured.

As illustrated in FIG. 3, an azimuth angle (Az) may be expressed as an angular value from an X-axis to the target 320. Range (R), radial velocity ($V_r$) and azimuth (Az) values can be measured through direct observation and are thus considered precise in this case. A range, radial velocity and azimuth from the sensor 310 to the target 320 can be determined using known radar signal processing techniques. In detail, since Az is relative to the X-axis, the Az value may be determined by comparing X-axis and a line (same as the line represented as a range) to the target 320.

The sensor 100 may record changes of azimuth (Az) over time by observing the movement of the target. Using the records of azimuth change, the sensor 100 may calculate or otherwise determine an azimuth rate value, which is the change rate of the azimuth. Based upon the range, radial velocity, and azimuth rate value, the sensor 100 may calculate or otherwise determine a tangential velocity ($V_t$) of the target. The lateral and longitudinal velocities ($V_x$, $V_y$) and Cartesian position ($P_x$, $P_y$) may be obtained based upon a range, azimuth (Az), azimuth rate value, radial velocity ($V_r$), and tangential velocity ($V_t$).

Figure 3A:
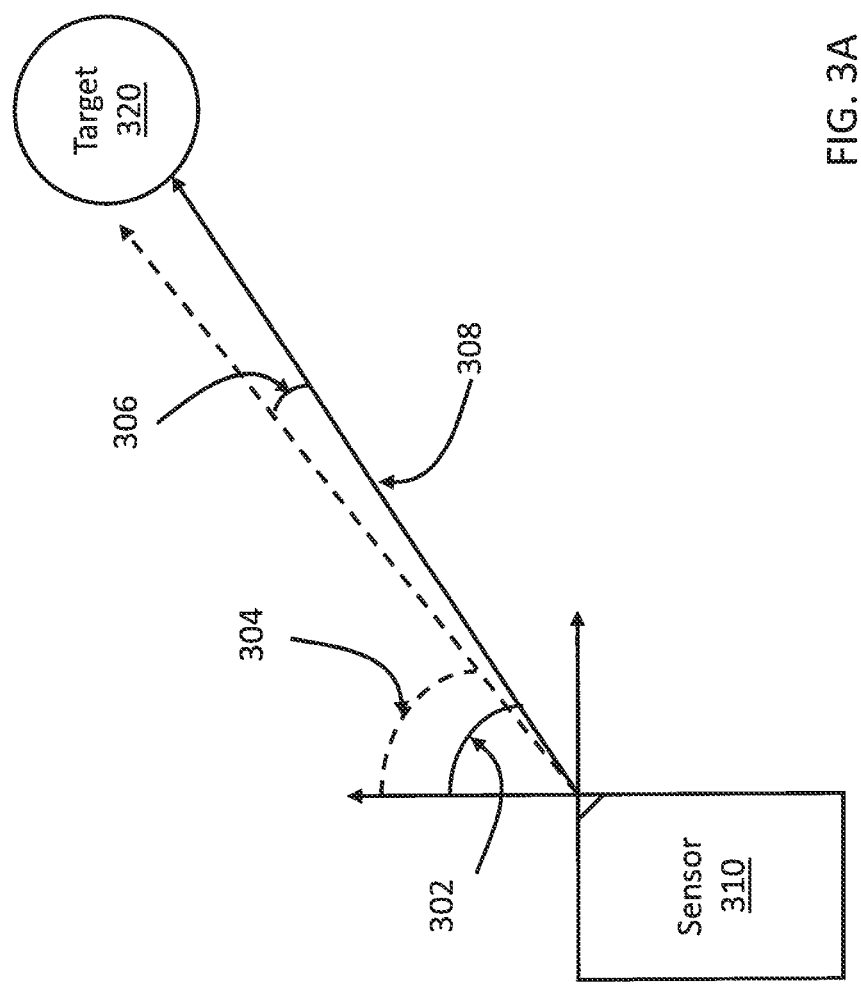
FIG. 3A is a diagram showing a projected azimuth and corresponding error according to the concepts described herein.

Referring now to FIG. 3A, as described above in conjunction with FIG. 3, an azimuth rate value and tangential velocity ($V_t$) may be determined (e.g., via calculation or other techniques) based upon observation records (e.g., measured data) of the target movement. This provides two orthogonal measures of velocity, a radial velocity ($V_r$) and a tangential velocity ($V_t$). These values may be used to determine $V_x$ and $V_y$ by using a transform technique, specifically a rotation by the azimuth to the target. The values of $V_x$ and $V_y$ can be transformed back into polar coordinate to create an estimated heading direction of the target. The estimated heading and target velocity create a projected position of the target at some point in the future. In addition, the sensor may determine an estimated azimuth rate value (not shown). For example, the signal processor (e.g., 120 in FIG. 1) may apply linear regression to azimuth records to generate a projected azimuth value 304 and an estimated azimuth rate value.

Alternately, the least absolute deviation method may be applied to project the values. Other types of estimation methods may also be used to determine projected values for azimuth and azimuth rate value. Since the values are estimated, these projected azimuth and estimated azimuth rate values may differ from actual azimuth 302 and azimuth rate values. Thus, a first estimated error value 306 associated with the projected azimuth value and a second estimated error value (not shown) associated with the estimated azimuth rate value may be determined.

Figure 3B:
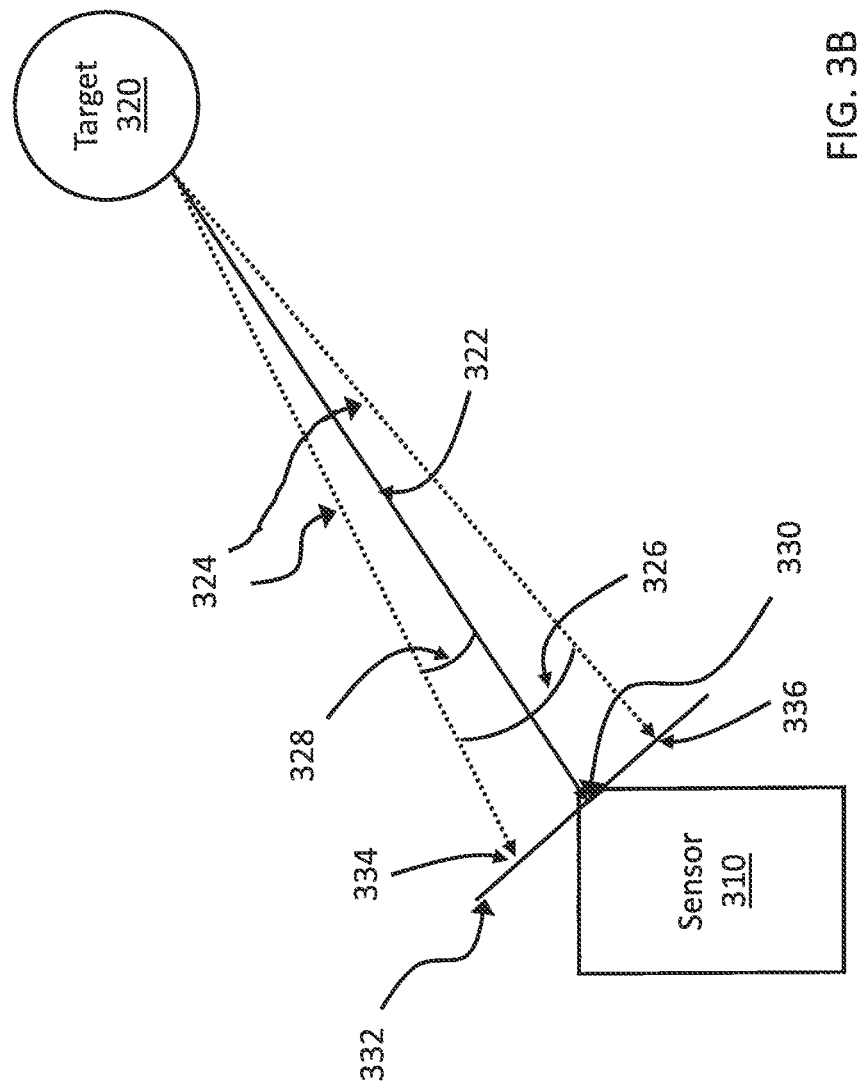
FIG. 3B is a diagram showing a direction of a target and cross track boundary according to the concepts described herein.

Referring now to FIG. 3B, the linear regression calculate may also provide error estimates on the azimuth and azimuth rate values. The estimated heading 322 and target velocity creates a projected position, for example 330, of the target at some point in the future. The estimated heading 322 of the target 320 may be called a cross track line. The heading vector that shows the estimated heading of the target may be projected into the future to the point where it intersects a line 332 drawn through the sensor and perpendicular to the azimuth. This may be called a cross track position 330 of the projected cross track 322. Based upon estimated error (e.g., 306 in FIG. 3A) associated with the projected azimuth and azimuth rate values, an error 328 associated with the cross track 322 may be calculated. The dotted lines 324 represents limits of errors associated with the cross track 322 and the width 326 of limits may indicate uncertainty of the projected cross track 322. Accordingly, the estimate errors on azimuth rate, tangential velocity and heading may be used to estimate a cross track position error 328.

Figure 4:
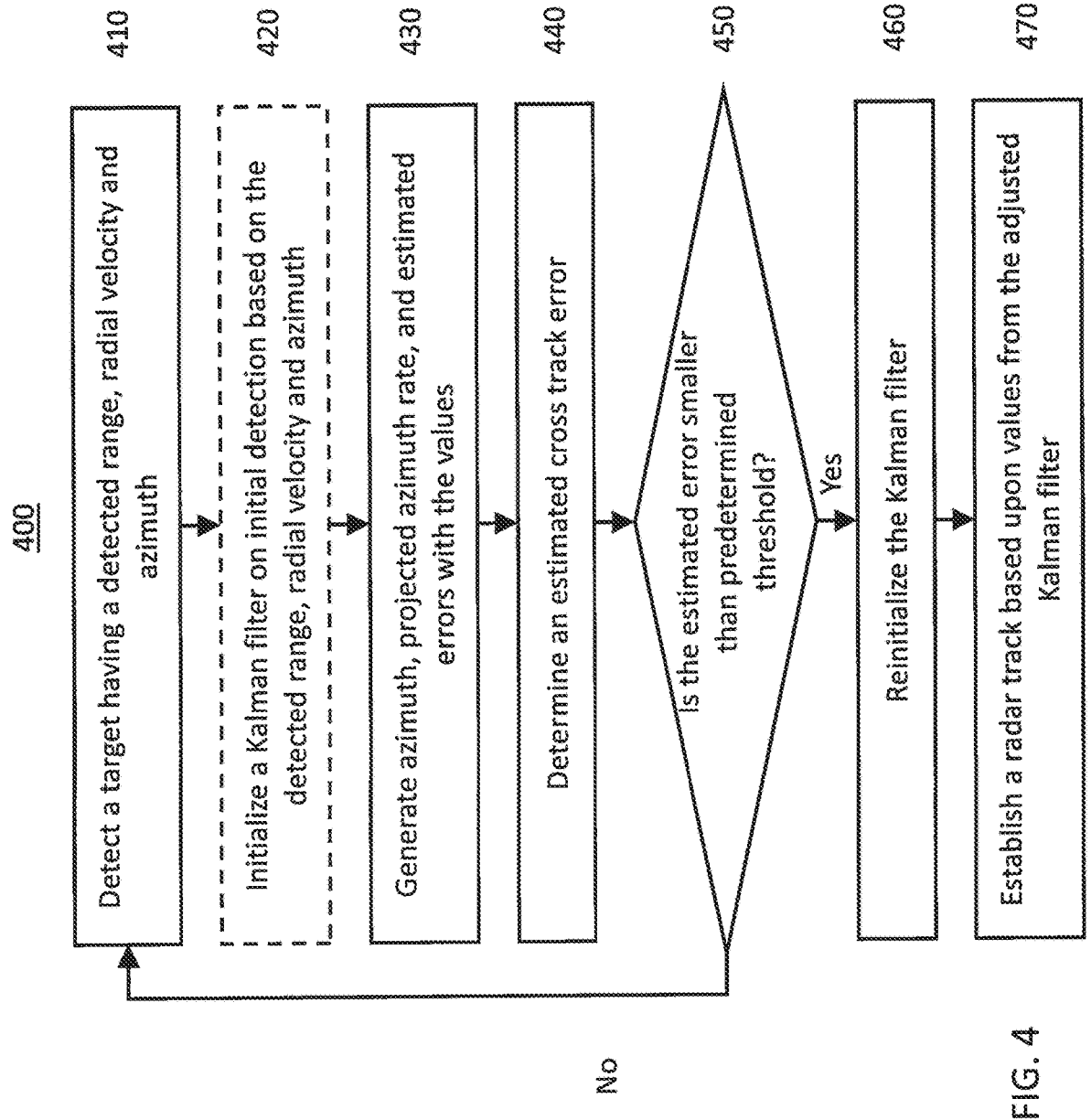
FIG. 4 is a flowchart of a process for initializing a radar track according to the concepts described herein.

FIG. 4 is a flow diagram illustrating the processing performed by a sensor (e.g., one of sensors 100, 204a, 204b in FIGS. 1 and 2) to initialize a radar track. The rectangular elements (typified by element 410), herein denoted "processing blocks," represent computer software instructions or groups of instructions. The diamond shaped elements (typified by element 440), herein denoted "decision blocks," represent computer software instructions or groups of instructions which affect the execution of the computer software instructions represented by the processing blocks. The flow diagram does not depict syntax of any particular programming language. Rather, the flow diagram illustrates the functional information one skilled in the art requires to generate computer software to perform the processing required of system 100 (and/or systems 204a, 204b and 600). It should be noted that many routine program elements, such as initialization of loops and variables and the use of temporary variables are not shown. Further, the processing and decision blocks are unordered meaning that the processing performed in the blocks can be done in any convenient or desirable order unless otherwise stated or order is evident from the context. This figure does not show the iterative process of updating the Kalman filter on each measurement cycle. On the first detection of a new target, initialize the Kalman for the purposes of finding additional associated detections (which has "easy" Kalman accuracy requirements focusing on position and not heading). Additional detections will update the Kalman position. In parallel, there is a linear regression on azimuth running to estimate azimuth rate and errors on azimuth and azimuth rate. When this linear regression on azimuth has low enough error, the azimuth rate is used to estimate a more accurate Vx and Vy and the Kalman filter is reinitialized with better velocity which is a better heading estimate.

Referring now to FIG. 4, processing begins in processing block 410 in which a sensor (e.g., one of sensors 100, 204a, 204b) detects a target. In general, a sensor processes return data to detect a target within a field of view (e.g., such as one of the fields of view 206, 208 described above in FIG. 2). The sensor further processes the measurement data to detect a range, radial velocity and azimuth of the target, as described above at least in conjunction with FIGS. 3 and 3A.

In processing block 420, the initially detected values (e.g., detected range, radial velocity and azimuth) are used to initialize values of a Kalman filter (such as Kalman filter 122 in FIG. 1). This process of initializing the Kalman filter is performed only upon the initial detection of the target. For following detections of the target, processing block 420 is not performed. The Kalman filter uses a lateral and longitudinal velocity ($V_x$, $V_y$) for initialization. On the first detection of the target, $V_x$ and $V_y$ are not known, so the Kalman filter is initialized using available values. Initially, the sensor (e.g., via a signal processor such as signal processor 120 shown in FIG. 1) considers that the target is heading directly toward sensor 100, which means that a tangential velocity ($V_t$) is assumed to be zero. As described above, the radial velocity ($V_r$) of the target is measurable.

Since there has been no movement observed with the initial detection, the tangential velocity (V$_t$) cannot be determined, and therefore is set to a constant value such as zero. This assumption of setting the tangential velocity to zero (or setting the azimuth rate to zero) is assuming the worst case assumptions for detecting collisions. Since, there is no basis for setting the tangential velocity on the first measurement, this assumption is reasonable from the safety point of view. Alternately, it may be assumed that the heading of the target is towards to the edges of an alert zone. This assumption may balance the uncertainty between a false alert and a missed alert. Using the tangential velocity determined based upon the selected assumption, the sensor (e.g., via signal process 120) may determine V$_x$, V$_y$ values based upon the initial values and initializes the Kalman filter using the values.

As described before, if the target is heading towards the sensor 100, this initialization method would be acceptable. However, for targets that are not heading towards the sensor, the Kalman filter is initialized with incorrect values. As more measurement data is collected as the target moves, the Kalman filter may be reinitialized with values which produce a target track having an accuracy which is increased compared to the accuracy of the initial track.

In processing block 430, the sensor (e.g., via a signal processor such as signal processor 120 described in FIG. 1) generates projected azimuth and estimated azimuth rate values. As described in conjunction with FIG. 3A, azimuth and azimuth rate values may be estimated using the detected azimuth records. According to the concepts described herein, the sensor (e.g., via a signal processor such as signal processor 120) applies a weighted incremental linear regression technique on azimuth records versus time to project azimuth rate values. Alternately, a parallel regression process may be used to project azimuth rate.

In addition, estimated errors associated with the projected azimuth and estimated azimuth rate values are calculated respectively. In detail, the linear regression technique first estimates the slope of azimuth over time, which is an azimuth rate value. In a sensor which utilizes multiple transmit and/or receive beams, such as described in the aforementioned U.S. Pat. No. 7,071,868, azimuth is measured over a series of detections/operations performed utilizing the full group of beams included in the sensor to cover a desired field of view. Such a series of detections/operations are sometimes referred to as major cycles such as described in U.S. Pat. No. 7,071,868. Estimate of an error regarding the slope of azimuth is also produced. Using the azimuth rate value, a tangential velocity (V$_t$) may be calculated, since V$_t$ is azimuth rate value multiplied by range. Accordingly, the following formula may be used to determine tangential velocity·V$_t$:

$$V_t = range \times dAz/dt$$

Figure 7:
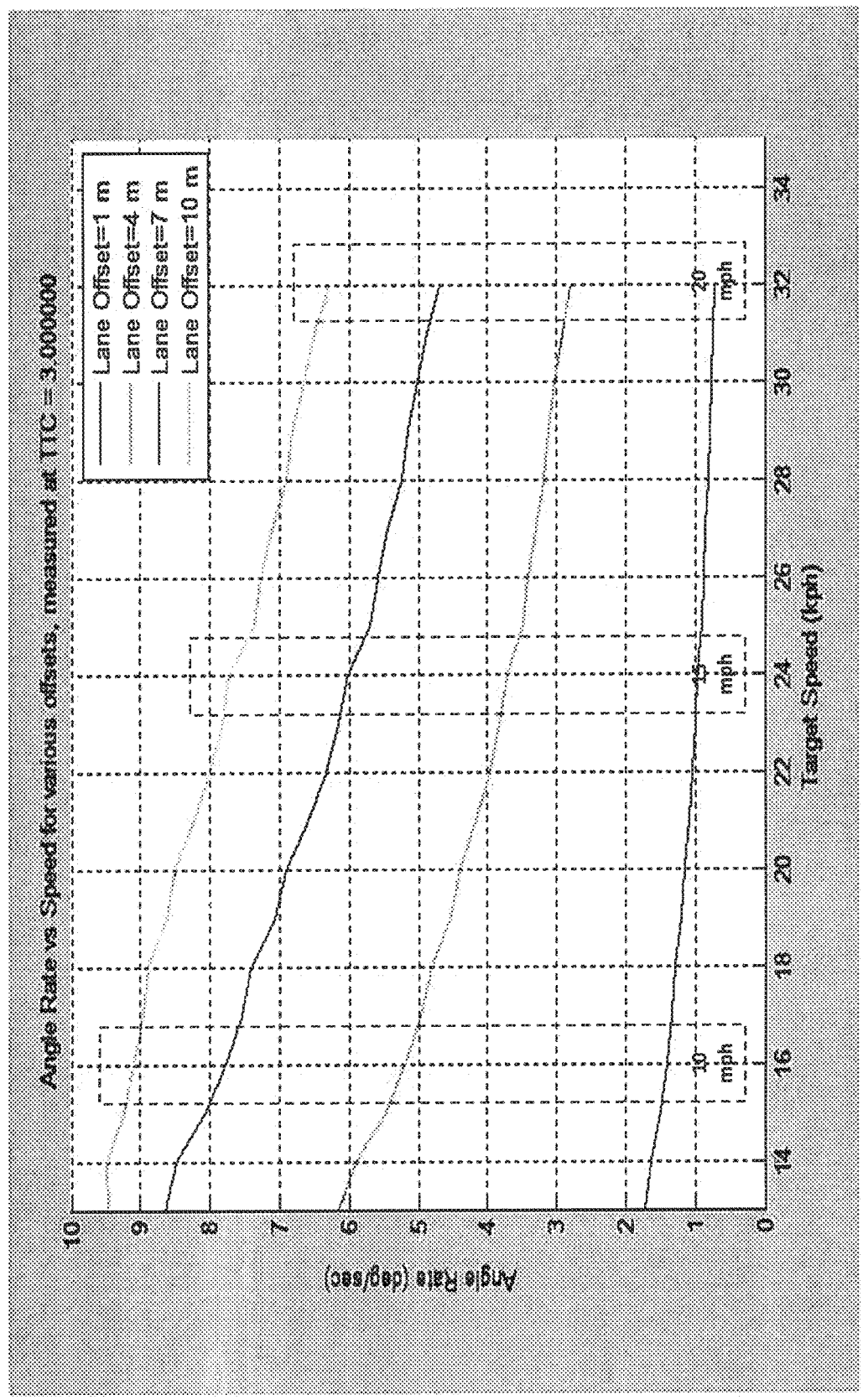
FIG. 7 is an illustrative plot of target speed vs. angle speed showing the effects of speed in estimating azimuth rate according to the concepts described herein.

If V$_t$ is zero, it means that the target is directly heading towards the sensor. Based upon the azimuth rate value, a probability of collision between the object and a vehicle in or on which the sensor id disposed of may also be determined. In an illustrative embodiment, the sensor may determine that there is no risk of collision when the azimuth rate value is above a threshold value (e.g., seven (7) degrees/sec). For example, in an illustrative embodiment, if a time to collision (TTC) is set at 3 seconds, a high-speed target is likely to have a longer range at TTC=3 which lowers azimuth rate, but the high speed of the target increases azimuth rate at the same time. For a low speed target, with TTC=3, the target is closer and the closeness increase azimuth rate, but the lower speed of the target decreases the azimuth rate at the same time. That is, the effects from the speed offset each other to some extent in terms of determining azimuth rate. The graph in FIG. 7 shows results from an illustrative experiment. The graph indicates that targets with an offset in cross track heading of 7 meters (a target which crosses 7 meters from the sensor should not alert) have an angle rate of about 7 degrees/sec. This means that a radar needs to detect the difference between a 4-degrees angle rate and a 7-degrees angle rate to make a good decision on risk of collision. Accordingly, a threshold may be determined by observing required angle rate to reduce risk of collision in various situations.

As the sensor collects more measurement data about the target, the projected azimuth and estimated azimuth rate value may be updated incrementally. The sensor 100 may collect measurement data about the target within a given period of time (e.g. the period of time required to complete one or a selected number of major cycles). In some embodiments, the time period may be one major cycle corresponding to 45 msec, but the time period may be longer or shorter. In some embodiments, some time periods may be skipped using a predetermined rule. For example, the sensor may collect measurement data for the first 45 msec, skip the next 100 msec, and collect data for 45 msec.

Errors in the tangential velocity computation may indicate errors in the estimated heading of the target, and/or errors in estimated intercept position of the target regarding the sensor. Based upon these calculations of the tangential velocity and corresponding azimuth rate value, the estimated error in the direction of the target may be calculated as a product of range and the standard deviation of the azimuth rate value (i.e., range*std dev of azimuth rate value). In addition, the estimated error in a starting position of the target may be calculated as a product of an estimated error in azimuth and range (i.e., estimated error in azimuth*range). As can be appreciated by those of ordinary skill in the pertinent art, other information may be obtained by combining these calculations.

Significantly, the processing presented herein uses a weighted incremental linear regression to form an estimate (and, ideally, the best estimate) of the azimuth and azimuth rate value using the azimuth records. The term 'weighted' means that detections having a low estimated error are given more weight in the incremental linear regression process than detections having a higher estimated error. As can be appreciated by those of ordinary skill in the pertinent art, the terms 'low' and 'high' are relative terms. In some embodiments, the 'weights' may be determined based upon estimated azimuth error derived from a model of error v. signal to noise ratio. The weights may be calibrated according to real data or simulation data. The process uses estimated error with azimuth as weights of the linear regression. Accordingly, the processing described herein reduces the chance (and ideally, prevents) low-quality measurements having more influence than high-quality measurements. That is, a detection having an estimated error which is lower than the estimated error of other detections contributes more to create a correct result than detections having a higher estimated error. As more measurement data is collected (i.e., more measurements are made), the process will generate more accurate projections. Furthermore, the process takes into account signal to noise ratio (SNR) with signals sent and received by a sensor (e.g., sensor 100) when projecting azimuth of the target. In embodiments, azimuth measurements may vary in accuracy from about +/−1 deg to about +/−10 deg depending on the SNR and other factors.

In conventional linear regression algorithms, estimate in error with the regression is performed by measuring the distance of each measurement from a line produced by the regression in Cartesian coordinates. This conventional method is an alternative to using information about the error in azimuth measurements available from estimating the SNR that is described above.

In contrast to such conventional techniques, the weighted incremental linear regression technique described herein employs linear regression in polar coordinate space. One benefit of performing linear regression in polar coordinate space is a simpler implementation. As described above, a radar may perform a direct measurement of azimuth and estimate error associated with the measured azimuth. Performing a linear regression on the measured azimuth values to project an azimuth rate does not require an additional transformation of the raw data from a radar. In contrast, other coordinate systems such as $V_x$ and $V_y$, or target velocity and heading would require transforming the raw radar data. Furthermore, regression in polar coordinate space is more numerically stable than regression performed in Cartesian coordinate space where, for example, the slope of a trajectory line can be infinity in some situations.

The process described herein is also designed to work incrementally in time when projecting azimuth, azimuth rate value and also when calculating estimated errors with the projecting azimuth and azimuth rate value. When a new detection occurs, instead of looping over all previous measurements, the process uses results (i.e., projected values) from the previous run(s) of the process along with new measurement data. Therefore, this process updates on each measurement cycle (e.g., each major cycle) without the need to store a history of measurements. This approach enables response in real time (or near-real time) with a reduced amount of memory and computational resources compared with conventional techniques. Accordingly, the concepts described herein may be implemented with low-cost embedded hardware. Furthermore, since the process described herein uses linear regression incrementally, there is no need for a detection buffer and buffer replay because this process does not need to store previous data to replay for a better projection.

Based upon the detected range, radial velocity, and determined the tangential velocity of the target, a sensor (e.g., via a signal processor such as signal processor 120) may determine (in polar coordinates), a lateral velocity, and a longitudinal velocity of the target. These values may be used when reinitializing the values of the Kalman filter as described below.

In processing block 440, the sensor (e.g., via a processor such as signal processor 120) may determine a projected cross track or a projected heading (e.g., 322 in FIG. 3B), as described above in conjunction with FIG. 3B. In addition, based upon estimated error (e.g., 306 in FIG. 3A) associated with the projected azimuth and azimuth rate values, an error (e.g., 328 in FIG. 3B) associated with the cross track may be calculated.

In processing block 450, the sensor (e.g., via a processor such as signal processor 120) determines if the linear regression process has enough data to form a satisfactory projection in cross track, azimuth and azimuth rate value. In order to make the decision, the sensor (e.g., signal processor 120) checks if the estimated projected cross track error, which is associated with the projected cross track, is below a predetermined threshold value. If it is determined that the estimated error is lower than the predetermined threshold value, meaning that the projected cross track value is within the desired accuracy, in processing block 450, the sensor (e.g., via signal processor 120) reinitializes values of the Kalman filter including velocity values in the Kalman filter. In addition, the sensor may alert an external system or a user for the event of the Kalman filter reinitialized.

If it is determined that the estimated errors are not lower than the predetermined thresholds, meaning that the linear regression process does not have enough data to form a satisfactory projection in azimuth and azimuth rate value, processing returns to processing block 410 where additional measurement data of the target is obtained (e.g. from additional radar return signals from the target).

In this case, since the Kalman filter was initialized once upon the initial detection of the target, processing block 420 is skipped, when a next detection occurs and processing proceeds to processing block 430 and then eventually to processing block 460 where the Kalman filter is reinitialized using newly projected cross track, azimuth and azimuth rate values.

In an illustrative embodiment, the decision of when to re-initialize or adjust the Kalman filter is based upon an estimated error of cross track error of the target projected to the time of the collision. The linear regression process is combined with a projection calculation that estimates where the target will be at a point where it intersects the cross track line (e.g., 332 in FIG. 3B), but also estimate the error on that estimate. The Kalman filter is reinitialized if the estimated error is lower than the specified threshold value. The threshold value may be determined in various ways. In one embodiment, a threshold may be determined based upon calibration so that an accurate probability of collision could be estimated from the size of a collision zone and the size of the uncertainty of the projected cross track error (e.g., from 334 to 336 in FIG. 3B). Based upon the sizes, a probability that the target will hit somewhere in the box may be calculated, and a threshold value may be determined to have a reasonably low probability of collision. For example, a threshold may be determined to have 5 meters of uncertainty with the projected cross track error (e.g., the length from 334 to 336 is 5 meters in FIG. 3B). The estimated errors are selected with respect to the false alert risk of collision since more distant object observations are required to be much more precise than object observations at close range. The estimated errors decrease more quickly for high-speed targets because linear regression accuracy depends upon a distance traveled and faster targets span more distance in fewer measurement cycles than slow targets. By taking into account both object observation distance and speed, this approach enables reaching higher overall radar performance.

In processing block 470, the sensor may establish a radar track based upon the reinitialized values of the Kalman filter. From now, the sensor may track the target more accurately using the reinitialized Kalman filter. In some embodiments, a radar track may be established when the Kalman filter was first initialized in processing block 420. However, while in 420, the initial track is used only to find associated detection based on a measured position and approximate (and some of them are assumed) velocities. In processing block 460, the Kalman filter is provided with more precise velocity estimates that can generate more precise heading projections. The sensor 100 may alert an external system or a user for the event of the radar tracking being established. In addition, the sensor 100 may alert the external system or user if there is any noticeable risk for a collision.

If a sensor is not able to establish a radar track for a prospective target, the sensor may abandon establishment of a radar track for the target. In some embodiments, the sensor may have a list of predetermined waiting times according to the detected range of a target. For example, the sensor 100 may wait longer if a target is farther from the sensor. For example, a sensor 100 may detect a target and start a track at a range of about 60 meters, but the sensor only gets a few detections with the range which are not enough to generate an azimuth rate with enough precision. Then the target may fade (i.e., out of sight) for up to 20 measurement cycles (MC). The track may continue to coast the estimate position and velocity of the target. Eventually the radar may have more detections of the target and the track may be in the right position to identify the detections as associated. The track continues to be updated and linear regression may continue to update projections for the target. In some embodiments, if the target fades for more than 20 MC, the track may be killed or abandoned. If the target changes with heading or speed too rapidly, the radar may not be able to associate the detections with a radar track, then the radar may drop the track. Furthermore, if the initial track is established in poor quality, coasting by the track may go wrong and lose detections. In contrast to the conventional methods, the method presented herein may wait longer before making the decision to not establish a radar track for a prospective target using a technique which includes a table of wait times. For example, in some embodiments, if a target fades for more than 20 MCs, the radar may drop a track.

Figure 5:
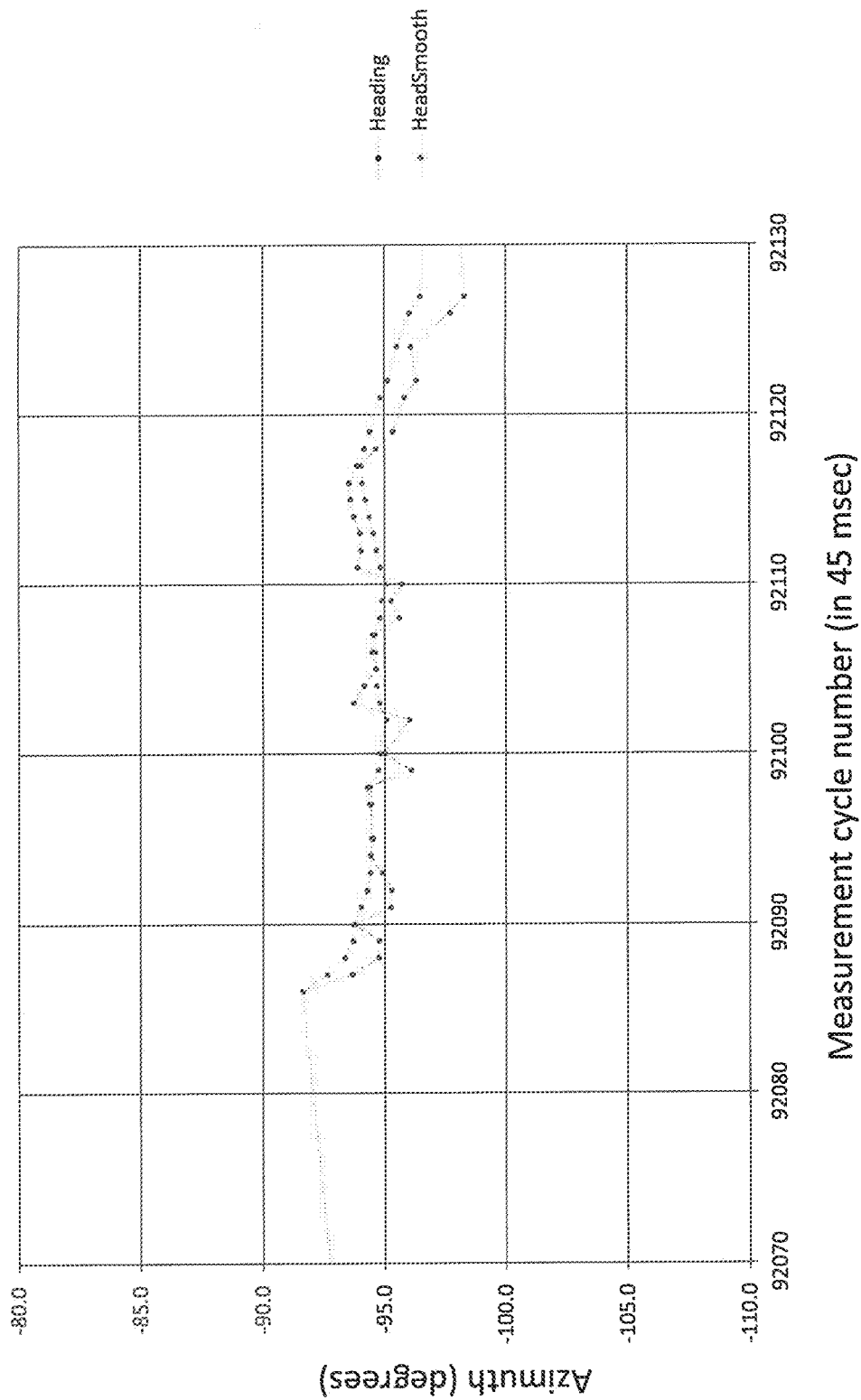
FIG. 5 is an illustrative plot of azimuth vs. number of measurement cycles showing the effects of a smoothing filter according to the concepts described herein.

Referring now to FIG. 5, the sensors described herein (e.g., sensor 100 in FIG. 1 and sensors 204*a*, 204*b* in FIG. 2) may also include a smoothing filter on the output of the Kalman filter. The X-axis is a Measurement Cycle number (in 45 msec) for a target and the Y-axis is azimuth of the target. The Measurement Cycle number means that a radar performed that number of measurements, which starts at 0. Such a smoothing filter may be applied in order to slow the response of projecting the azimuth value and azimuth rate value for a target. The smoothing filter may be used to adapt to the azimuth error caused by the integration of a sensor with a vehicle. For example, the azimuth measurement of the sensor may have error caused by reflections from a plastic bumper or metal body and refractions caused by the bumper. These errors may appear as small cyclical changes in azimuth as the target traverses the field of view. They may effect in various ways on a projected heading of a target as the target approaches. If the target approaches rapidly, the Kalman filter tends to average the variations, but when the target approaches slowly, there is little effect to the Kalman filter because the errors are not interpreted as noise. By filtering out such rapid changes within the measurement data, the sensor may provide more accurate projections.

In some embodiments, such a smoothing filter may be implemented as an infinite impulse response (IIR) filter. In embodiments, such an IIR filter may use 20% new and 80% old data, which provides satisfactory filtering in actual usage. Herein, 'new data' means the current data from a current measurement cycle (MC). 'Old data' means the result of IIR filter from the previous MC. In this case, the sensor may use data of IIR from the previous MC*0.8+ current detection from MC*0.2. The smoothing filter may also allow adapting to changes in the speed of a target. In some embodiments, slow targets may get more smoothing than fast targets. In addition, the smoothing filter may allow the sensor to adapt to another source of velocity change, which comes from "ripples" in a phase curve used to calibrate determined azimuth angle values. Small cyclical variations in azimuth are part of a phase curve calibration process and contribute to corresponding cyclical velocity changes from the Kalman filter. The effect is most significant for a low speed target because the filtering action of the Kalman attenuates the ripple effect at higher speeds. The graph in FIG. 5 shows that, when a smoothing filter is applied in an illustrative embodiment, the projected azimuth of a target does not change as rapidly as the azimuth that is projected without the smoothing filter.

Figure 6:
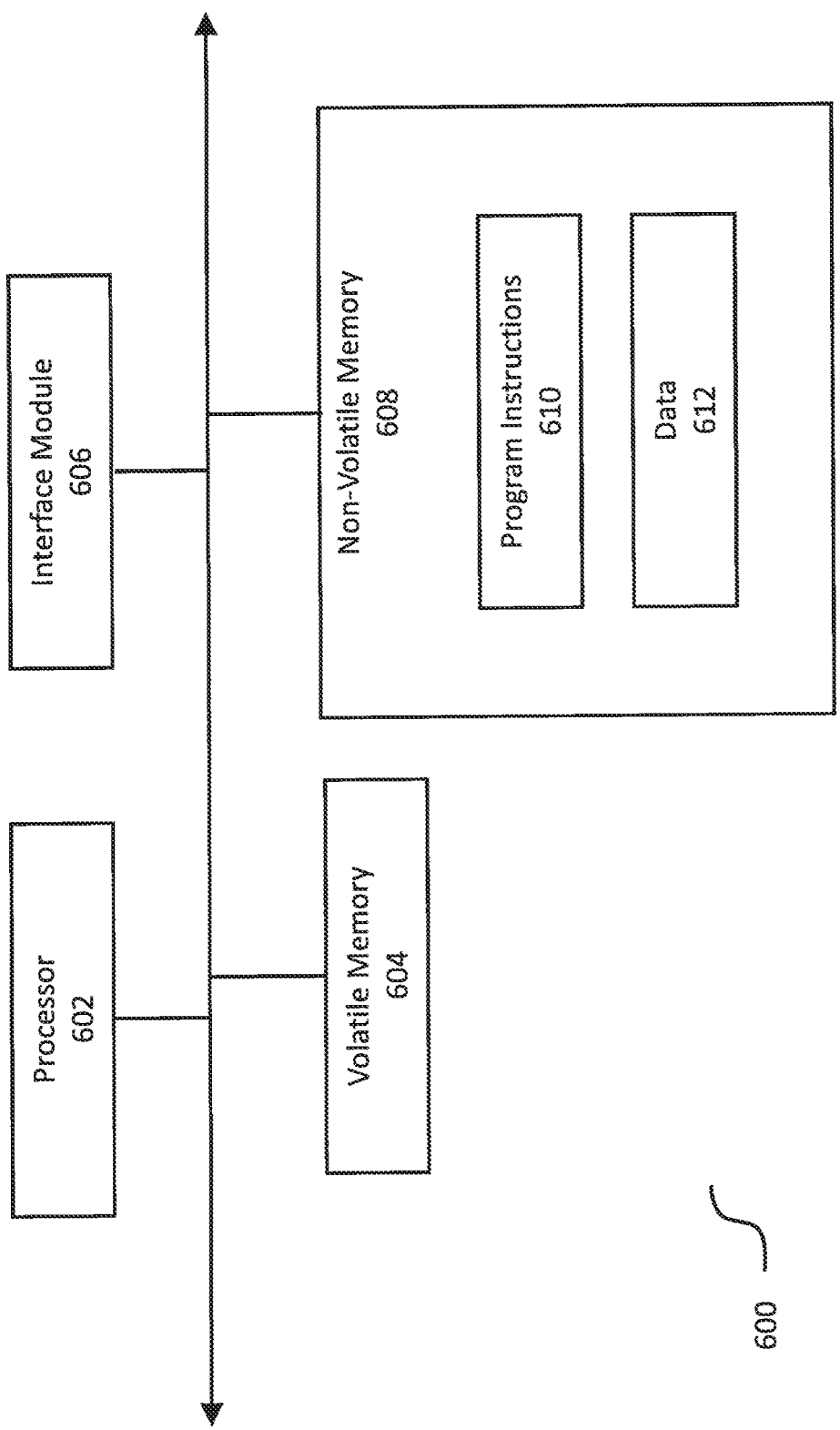
FIG. 6 is a block diagram of an illustrative implementation of a vehicle radar system described in FIG. 1 according to the concepts described herein.

Referring now to FIG. 6, an illustrative implementation of a processing device 600 which may be suitable to implement the processing techniques described herein includes a processor 602, a volatile memory 604, a non-volatile memory 606 (e.g., hard disk) and the interface module 608 (e.g., a user interface, USB interface and so forth). The non-volatile memory 606 stores computer instructions 612, an operating system 616 and data 618. In one example, the computer instructions 612 are executed by the processor 602 out of volatile memory 604 to perform all or part of the processes described herein (e.g., processes 400).

The processes described herein (e.g., process 400) is not limited to use with hardware and software of FIG. 1; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

By using the concepts described herein, it may be possible to overcome constraints in the traditional methods. Particularly, the sensors described herein (e.g., sensors 100, 204a, 204b) may handle measurement data from a fading target or a target with rapid changes in the speed, and may enable establishing a radar track more rapidly with accurate estimation.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. In a radar, a method for initializing a radar track, the method comprising:
   detecting a target within a field of view, the target having a detected range, radial velocity and azimuth;
   initializing values of a Kalman filter upon initial detection of the target based upon the detected range, radial velocity and azimuth;
   generating an azimuth value and estimated azimuth rate value of the target;
   determining a first estimated error value associated with the azimuth value and a second estimated error value associated with the estimated azimuth rate value based upon the detected azimuth;
   estimating a cross track error based upon the first and second estimated errors;
   in response to the estimated cross track error value being lower than a predetermined threshold value, reinitializing the values of the Kalman filter; and
   establishing a radar track based upon the reinitialzied values of the Kalman filter.

2. The method of claim 1, wherein the generating the azimuth value and estimated azimuth rate value further comprises:
   applying weighted incremental linear regression to the detected azimuth value to generate the azimuth value and the estimated azimuth rate values and to determine the first and the second estimated error values.

3. The method of claim 1, further comprising:
   determining a tangential velocity of the target based upon the estimated azimuth rate value and the detected range; and
   determining polar coordinates, a lateral velocity, and a longitudinal velocity of the target based upon the detected range, radial velocity, and the determined tangential velocity of the target.

4. The method of claim 3, further comprising:
   reinitializing the values of the Kalman filter based upon the determined polar coordinates, lateral velocity, and longitudinal velocity of the target.

5. The method of claim 1, wherein an estimate of signal-to-noise ratio (SNR) is used when determining the first and second estimated errors.

6. The method of claim 1, further comprising:
   applying a smoothing filter to the output of the Kalman filter to filter out rapid changes with heading of the target with a predetermined filtering ratio.

7. The method of claim 1, further comprising
   waiting for a duration of time determined from a list of wait times according to the detected range of the target; and
   in response to the duration being elapsed, abandoning to establish a radar track of the target.

8. A sensor comprising:
   a transceiver configured to transmit and receive signals to collect measurement data; and
   a signal processor configured to receive the measurement data from the transceiver, said signal processor configured to:
      detect a target within a field of view, the target having a detected range, radial velocity and azimuth position based upon the measurement data;
      initialize values of a Kalman filter upon initial detection of the target based upon the detected range, radial velocity and azimuth;
      generate an azimuth value and estimated azimuth rate value of the target;
      determine a first estimated error value associated with the azimuth value and a second estimated error value associated with the estimated azimuth rate value based upon the detected azimuth value;
      estimate a cross track error based upon the first and second estimated errors;
      in response to the estimated cross track error value being lower than a predetermined threshold value, reinitialize the values of the Kalman filter; and
      establish a radar track based upon the reinitialized values of the Kalman filter.

9. The sensor of claim 8, wherein the signal processor is further configured to:
   apply weighted incremental linear regression to the detected azimuth value to generate the azimuth value and the estimated azimuth rate values and to determine the first and the second estimated error values.

10. The sensor of claim 8, wherein the signal processor is coupled to a user interface, the user interface being configured to:
    display the detected range, the detected radial velocity, the azimuth value, the estimated azimuth rate value, the first estimated error, and the second estimated error.

11. The sensor of claim 10, wherein the user interface is further configured to:
    display a probability of collision with the target.

12. The sensor of claim 10, wherein the user interface is further configured to:
    display the measurement data collected by the transceiver.

13. The sensor of claim 8, wherein the signal processor is further configured to:
    alert a decision to an external system in response to the values of Kalman filter being reinitialized.

14. The sensor of claim 8, further comprising:
    a second transceiver,
    wherein the transceiver transfers additional measurement data from the second transceiver and the signal processor uses the additional measurement data to establish the radar track.

* * * * *